(12) United States Patent
Whicker et al.

(10) Patent No.: US 10,913,144 B1
(45) Date of Patent: Feb. 9, 2021

(54) MUTLI-TOOL WITH LENGTH ADJUSTABLE HANDLE

(71) Applicants: Michael A. Whicker, Rock Springs, WY (US); Larry M. Nelson, Rock Springs, WY (US)

(72) Inventors: Michael A. Whicker, Rock Springs, WY (US); Larry M. Nelson, Rock Springs, WY (US)

(*) Notice: Subject to any disclaimer, the term of this patent is extended or adjusted under 35 U.S.C. 154(b) by 92 days.

(21) Appl. No.: 16/108,268

(22) Filed: Aug. 22, 2018

(51) Int. Cl.
| | | |
|---|---|---|
| B25G 1/04 | (2006.01) | |
| B25G 3/26 | (2006.01) | |
| A01D 7/08 | (2006.01) | |
| B25B 23/00 | (2006.01) | |

(52) U.S. Cl.
CPC ............ *B25G 3/26* (2013.01); *B25B 23/0021* (2013.01); *B25G 1/04* (2013.01); *A01D 7/08* (2013.01)

(58) Field of Classification Search
CPC ........ B25G 1/04; B25G 3/26; B25B 23/0021; A01D 7/08

USPC ......................................................... 172/370
See application file for complete search history.

(56) References Cited

U.S. PATENT DOCUMENTS

| | | | | |
|---|---|---|---|---|
| 3,153,252 A | * | 10/1964 | Ricciardi ................. | B25G 1/04 15/144.4 |
| 4,198,080 A | | 4/1980 | Carpenter | |
| 4,232,422 A | | 11/1980 | Fellmann | |
| 4,653,142 A | | 3/1987 | Upton | |
| 4,663,796 A | | 5/1987 | Helling et al. | |
| 7,284,928 B2 | | 10/2007 | Perez et al. | |
| 7,314,096 B2 | | 1/2008 | Shaffer et al. | |
| 2012/0144626 A1 | * | 6/2012 | Lanz ........................ | B25G 1/04 16/427 |
| 2014/0137338 A1 | * | 5/2014 | Meinzer et al. .......... | B25F 1/02 7/116 |
| 2014/0138280 A1 | * | 5/2014 | Meinzer et al. .......... | B25F 1/02 206/577 |

* cited by examiner

*Primary Examiner* — Tara Mayo-Pinnock
(74) *Attorney, Agent, or Firm* — Cramer Patent & Design, PLLC; Aaron R. Cramer

(57) ABSTRACT

A multi-tool incorporates an extendable spring-loaded handle that accommodates interchangeable tool heads using a quick-connect slip fit connection. The spring-loaded handle is capable of securing a selected length of the multi-tool in a locked position.

13 Claims, 5 Drawing Sheets

MUTLI-TOOL WITH LENGTH ADJUSTABLE HANDLE

RELATED APPLICATIONS

Not applicable.

FIELD OF THE INVENTION

The presently disclosed subject matter is directed to multi-tools with length adjustable handles.

BACKGROUND OF THE INVENTION

A peek inside most garden sheds and garages across the country would most likely reveal a scene in which bicycles, lawn furniture, hoses, storage boxes, and the like are tossed in a tangled pile. Another component to this mess and perhaps the biggest culprits are yard tools such as shovels, rakes, hoes, and other yard tools. Their specialized use often requires the purchase of a tool that may only be used once or twice a year, but the storage space they occupy is a year-round problem. Many homeowners without garages or sheds often must do without such tools simply because there simply is no space to store them. This storage space is even a bigger problem for contractors, landscape workers, and others who must carry such tools to job sites in a truck or van. Accordingly, there is a need for a means by which common yard tools such as shovels, rakes, hoes, and the like can be stored in a compact manner while at the same time making them simple and easy to get to and use. The development of the tool 10 fulfills this need.

SUMMARY OF THE INVENTION

The principles of the present invention provide for An adjustable length yard tool comprises a tool head attached to a lower handle section via a quick-release mechanism, an upper handle section positioned axially to the lower handle section joined together by a rotating coupling system, the upper handle section is hollow and accepts insertion of the lower handle section within its hollow interior, a D-ring handle provided on an upper most end of the upper handle section, where the D-ring handle serves to provide comfort and control during usage of the adjustable length yard tool, and, a tool head shaft provided on the end of the tool head, the tool head shaft provided with two engagement pins, the two engagement pins arranged at diametrically opposing sides from each another along the tool head shaft, the engagement pins engage two generally L-shaped pin slots in the rotating coupling system, the entire rotating coupling system rotates a short distance in either a clockwise or a counterclockwise rotation by a first rotational travel path.

The handle section may be positioned within the hollow space of the upper handle section in an axial manner. A loose coil spring positioned with a first end against the upper face of the lower handle section and a second end of the upper handle section, the loose coil spring serves to aid in the automatic extension of the lower handle section when the long handle configuration of the adjustable length yard tool. The lower handle section and upper handle section is made of durable, strong material that withstands pressure and leverage applied along its length. The upper handle section is driven downward along a first travel path, whereupon the rotating coupling system is used to secure the D-ring handle as close to the lower handle section. The durable, strong material is selected from the group consisting of as steel, aluminum, fiberglass, or carbon fiber.

The tool head may be selected from the group consisting of a spade-style shovel head, a flat nosed shovel head, a garden rake head, a garden hoe head, a leaf rake head, a push broom head or a snow shovel head. The upper handle section is secured to the lower handle section at whatever length desired by the use of a slotted compression ring, as part of the rotating coupling system. The compression ring is permanently affixed to a distal end of the upper handle section with a threaded collar about its exterior. The threaded collar is moved along a second rotational travel path that is compressed or relaxed against the lower handle section where the slotted compression ring allows for no movement or movement.

The slotted compression ring is made of a durable material with a low coefficient of friction while the durable material with a low coefficient of friction is nylon. The rotating collar is secured by 2 spring-loaded levers, the spring-loaded levers must be depressed inward along a second travel path to allow for the first rotational travel path to occur in an effort to prevent unwanted rotation. The spring-loaded levers are released once the desired engagement or disengagement of the engagement pins has occurred.

During initial engagement of the engagement pins, the user would first position the engagement pins within a first part of the pin slots, then, by holding the lower handle section in 1 hand, and while simultaneously squeezing the spring-loaded levers and turning the rotating collar with the other hand, the engagement pins would be driven into the final part of the pin slots, whereupon release of the spring-loaded levers, the engagement pins are secured. The adjustable length yard tool has an overall length in an extended state of 7 feet while the adjustable length yard tool has an overall length in a fully collapsed state of 4 feet. The adjustable length yard tool has an intermediate length in the range of 4 to 7 ft. obtained by the rotating coupling system to secure the lower handle section and upper handle section at a desired length.

The adjustable length yard tool provides for reduced storage space, neater storage space, lower overall cost than multiple individual tools, and no requirement of tools for assemble or disassembly when compared to conventional tools. A storage case is provided for storage and ease of transport for any and all components of the adjustable length yard tool.

BRIEF DESCRIPTION OF THE DRAWINGS

The advantages and features of the present invention will become better understood with reference to the following detailed description and claims when taken in conjunction with the accompanying drawings in which like elements are identified with like symbols and in which:

Figure 1:
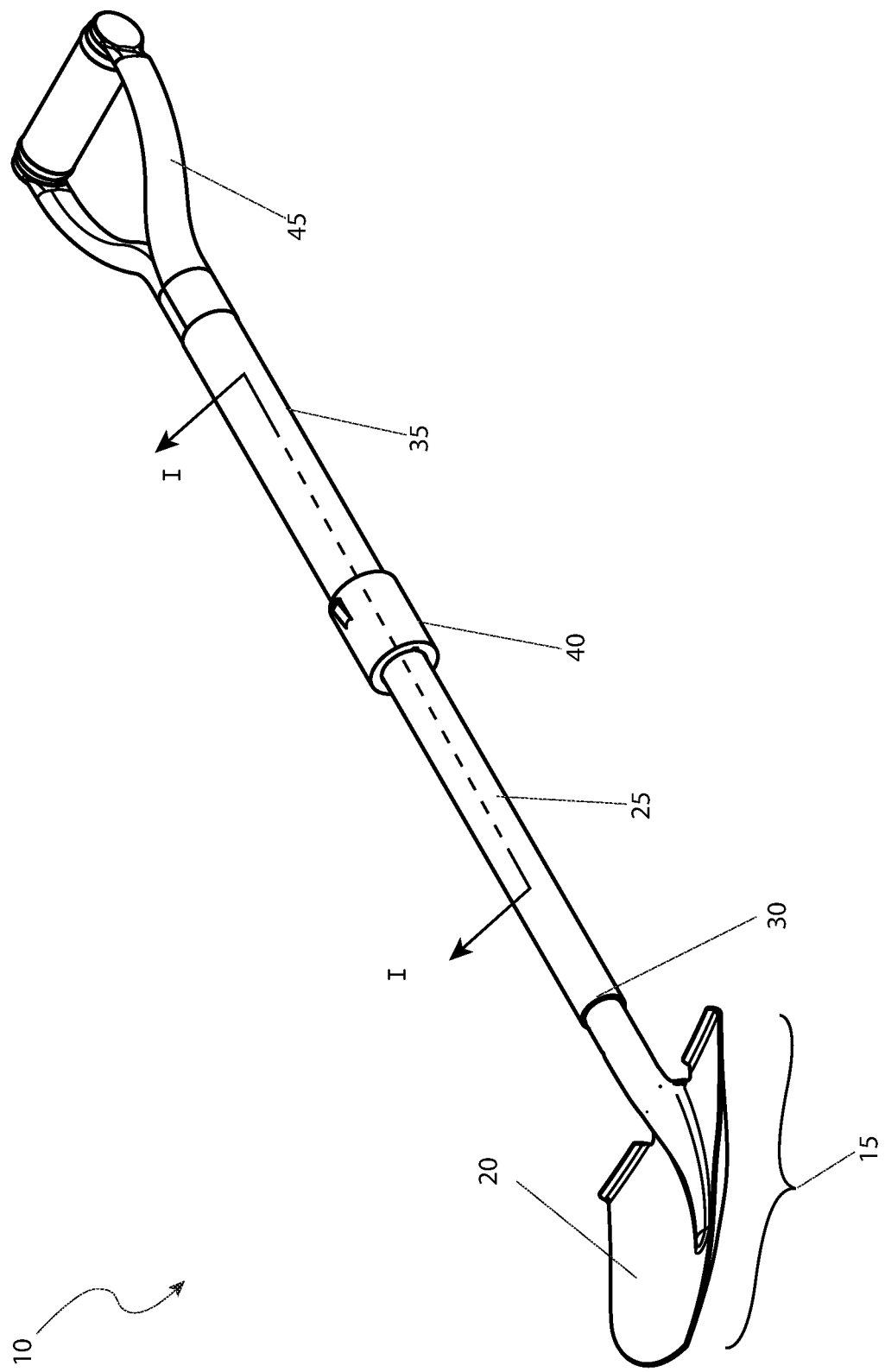
FIG. 1 is a side view of the adjustable length yard tool 10, shown in an extended state, according to the preferred embodiment of the present invention.

DESCRIPTIVE KEY 10 adjustable length yard tool
15 tool head
20 spade-style shovel head
25 lower handle section
30 quick-release mechanism
35 upper handle section
40 rotating coupling system
45 "D"-ring handle
50 first travel path "$T_1$"
55 tool head shaft
60 engagement pin
65 pin slot
70 first rotational travel path "$R_1$"
75 rotating collar
80 spring-loaded lever
85 second travel path "$T_2$"
90 hollow space
95 loose coil spring
100 upper face
105 closed end
110 slotted compression ring
115 threaded collar
120 second rotational travel path "$R_2$"
125 flat nosed shovel head
130 garden rake head
135 garden hoe head
140 leaf rake head
145 push broom head
150 snow shovel head
155 storage case

DETAILED DESCRIPTION OF THE PREFERRED EMBODIMENT

The preferred embodiment of the present invention is depicted in FIGS. 1 through 5. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one of the referenced items.

1. Detailed Description of the Figures

Referring now to FIG. 1, a side view of the adjustable length yard tool 10, shown in an extended state, according to the preferred embodiment of the present invention is disclosed. The adjustable length yard tool 10 (herein also described as the "tool") 10, includes a tool head, here depicted as a spade-style shovel head 20. The spade-style shovel head 20 would be used for general purposed digging. Optional variations on the tool head 15 will be provided herein below. The spade-style shovel head 20 is physically attached to a lower handle section 25 via a quick-release mechanism 30. The quick-release mechanism 30 will be described in greater detail herein below. An upper handle section 35 is positioned axially to the lower handle section 25 and is joined together by a rotating coupling system 40. The upper handle section 35 is of a hollow nature and can accept the insertion of the lower handle section 25 within its hollow interior. Additional details on the interior construction of the lower handle section 25 and the upper handle section 35 will be provided herein below.

Figure 2:
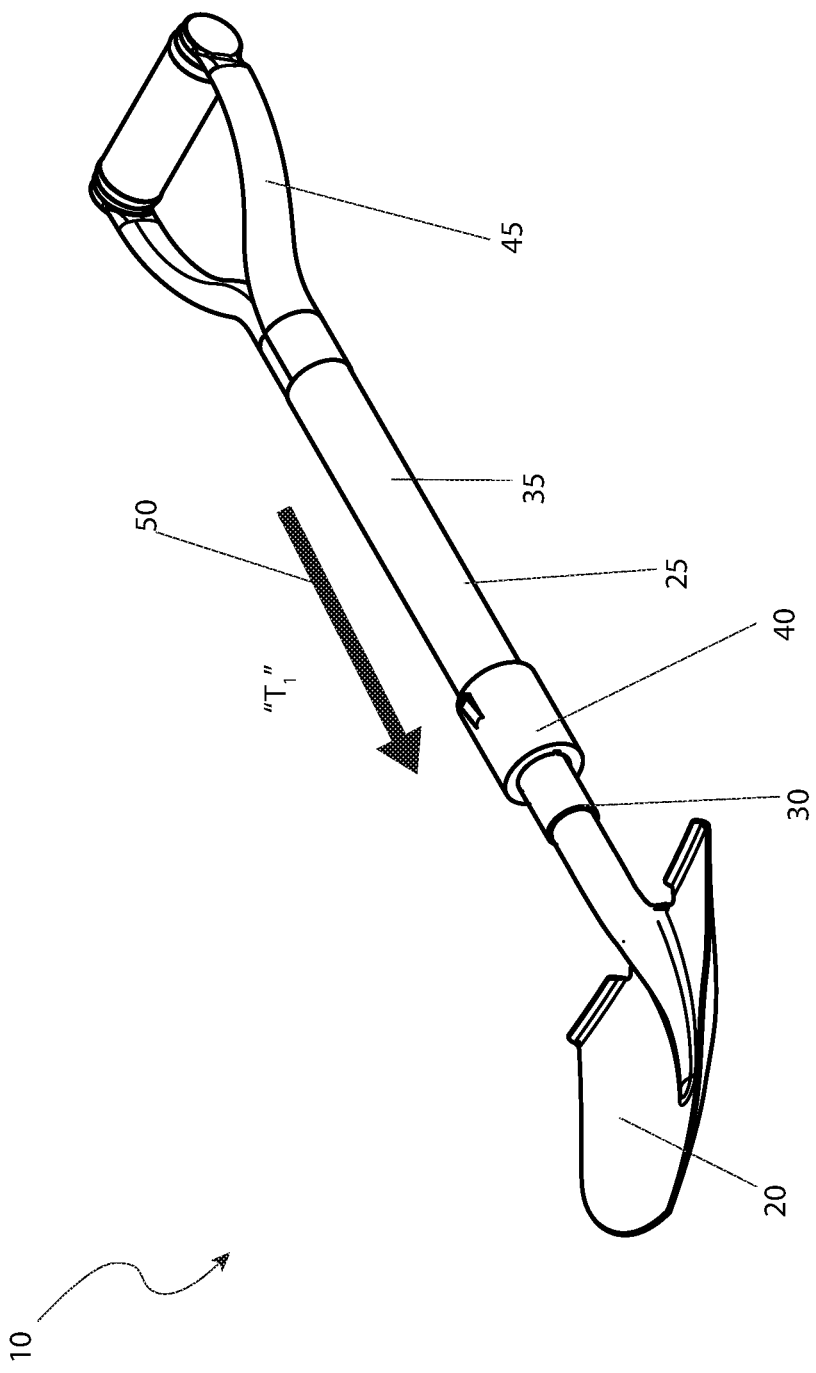
FIG. 2 is a side view of the adjustable length yard tool 10, shown in a retracted state, according to the preferred embodiment of the present invention.

A "D"-ring handle 45 is provided on the upper most end of the upper handle section 35 where it serves to provide comfort and control during usage of the tool 10. The overall length of the tool 10, in its extended state as shown, is envisioned to be a maximum of approximately seven feet (7 ft.) from end to end. In its fully collapsed state (as shown in FIG. 2), it is envisioned to be approximately four feet (4 ft.) long. Any intermediate length (between four and seven feet (4-7 ft.)) can be obtained by usage of the rotating coupling system 40 to secure the lower handle section 25 and upper handle section 35 at the desired length. This length as displayed in FIG. 1 is envisioned for use with tools that are of typical long handled design such as digging spades, garden rakes, leaf rakes, hoes, and the like.

Referring next to FIG. 2, a side view of the tool 10, shown in a retracted state, according to the preferred embodiment of the present invention is depicted. In this state, the tool 10 remains in the same configuration as FIG. 1, with the added exception that the upper handle section 35 is driven downward along a first travel path "T1" 50 whereupon the rotating coupling system 40 is used to secure the "D"-ring handle 45 as close to the lower handle section 25. This length as displayed in FIG. 1 is envisioned for use with tools that are of typical long handled design such as gardening spades, snow shovels, coal (or flat edge shoves, and the like. The retracted configuration is also ideal for those who are short of stature, children, or for use in confined spaces such as digging in trenches, along foundations, in ditches or the like.

Figure 3:
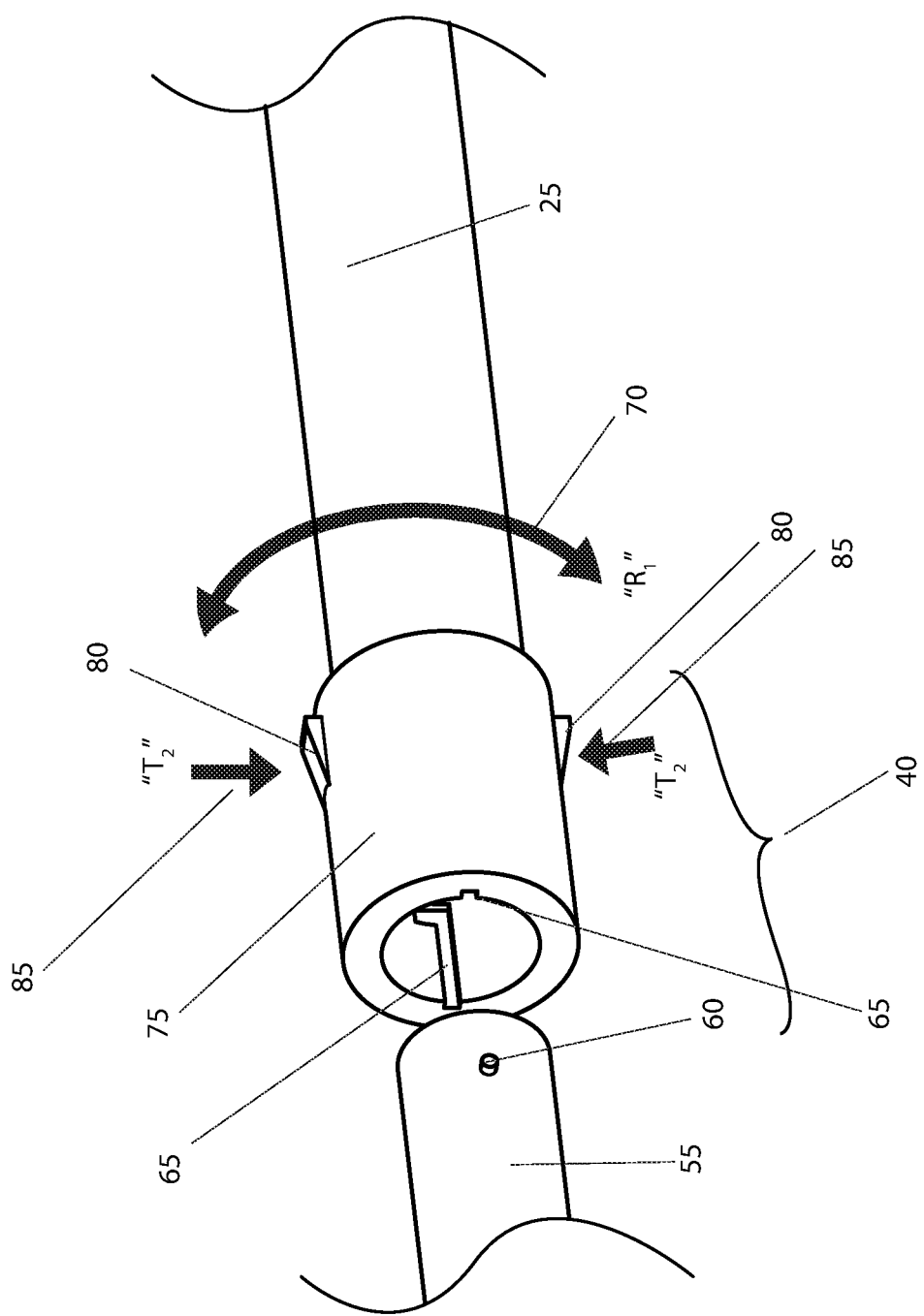
FIG. 3 is a detailed view of the rotating coupling system 40, as used with the adjustable length yard tool 10, according to the preferred embodiment of the present invention.

Referring now to FIG. 3, a detailed view of the rotating coupling system 40, as used with the tool 10, according to the preferred embodiment of the present invention is shown. A tool head shaft 55 as provided on the end of the tool head 15 (as shown in FIG. 1) is provided with two (2) engagement pins 60, (only one (1) of which are shown, due to illustrative limitations. These engagement pins 60 are arranged at diametrically opposing sides from each another along the tool head shaft 55. These engagement pins 60 engage two (2) generally "L"-shaped pin slots 65 in the rotating coupling system 40. The entire rotating coupling system 40 then rotates a short distance in either a clockwise or counterclockwise rotation as described by a first rotational travel path "R1" 70. However, in an effort to prevent unwanted rotation, one (1) rotating collar 75 is secured by two (2) spring-loaded levers 80. These spring-loaded levers 80 must be depressed inward along two (2) spring loaded levers 80 in a second travel path "T2" 85 to allow for said first rotational travel path "R1" 70 to occur. Once the desired engagement or disengagement of the engagement pins 60 has occurred, the spring-loaded levers 80 may be released. During use of initial engagement of the engagement pins 60, the user would first position the engagement pins 60 within the first part of the pin slots 65. Then, by holding the lower handle section 25 in one (1) hand, and while simultaneously squeezing the spring-loaded levers 80 and turning the rotating collar 75 with the other, the engagement pins 60 would be driven into the final part of the pin slots 65, whereupon release of the spring-loaded levers 80, the engagement pins 60 would be firmly secured.

Figure 4:
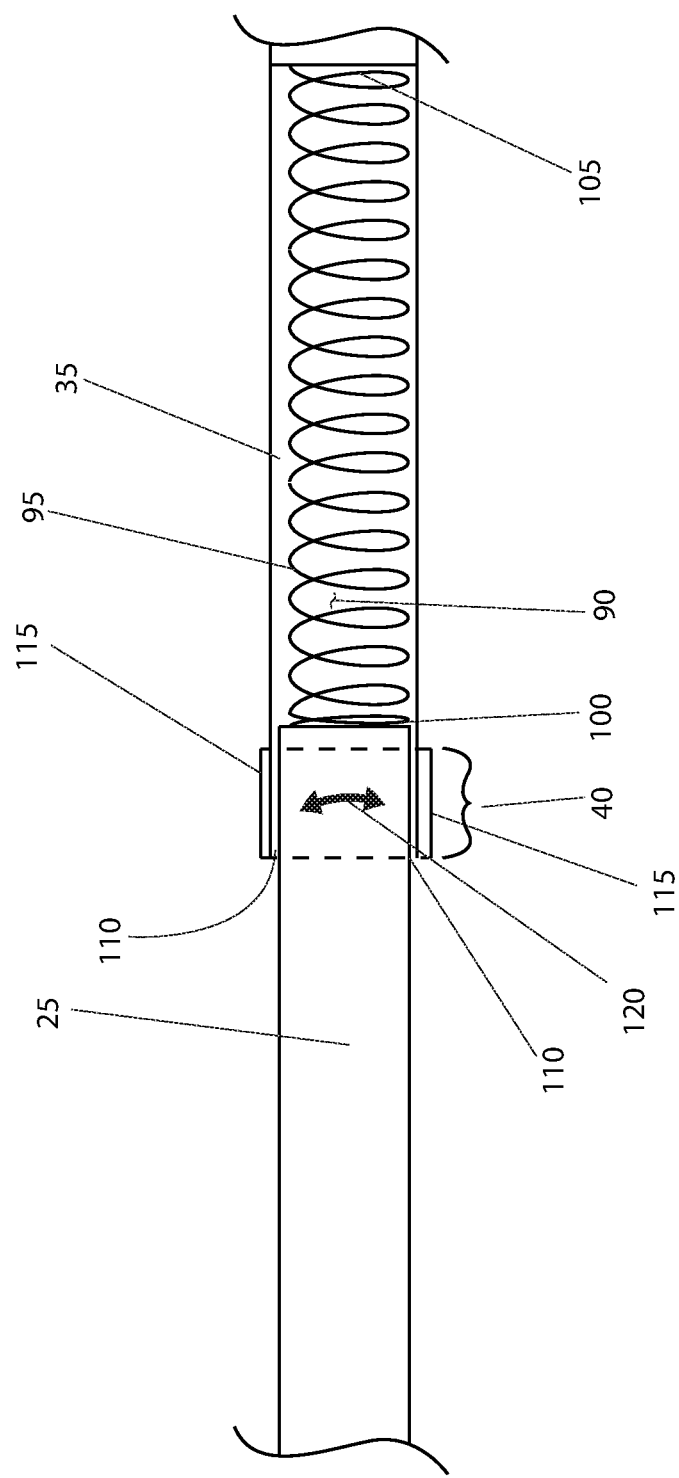
FIG. 4 is a sectional view of the adjustable length yard tool heads 10, as seen along a line I-I, as shown in FIG. 1, according to the preferred embodiment of the present invention.
Figure 5A:
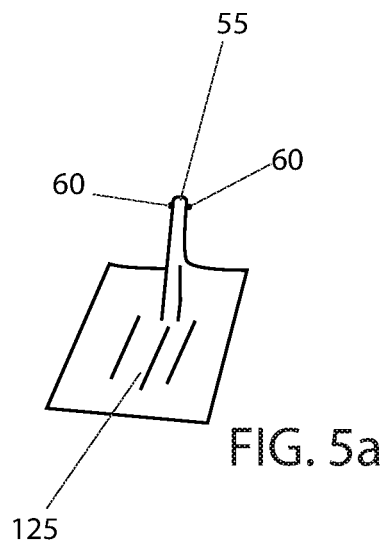
FIG. 5a perspective view of an optional tool head 15 that can be used with the adjustable length yard tool 10, according to a first alternate embodiment of the present invention.
Figure 5B:
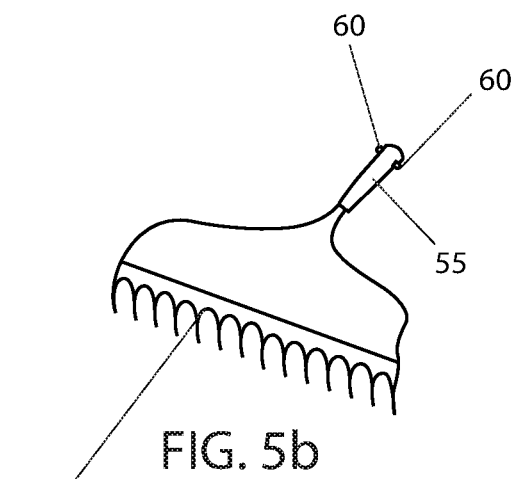
FIG. 5b perspective view of an optional tool head 15 that can be used with the adjustable length yard tool 10, according to a second alternate embodiment of the present invention.
Figure 5C:
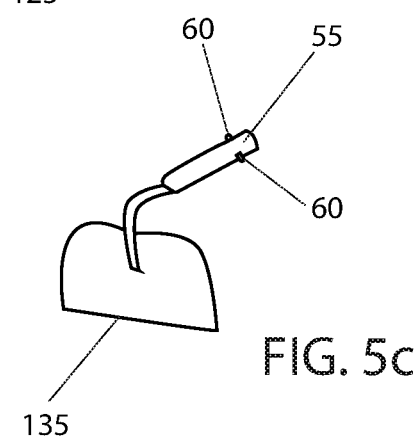
FIG. 5c perspective view of an optional tool head 15 that can be used with the adjustable length yard tool 10, according to a third alternate embodiment of the present invention.
Figure 5D:
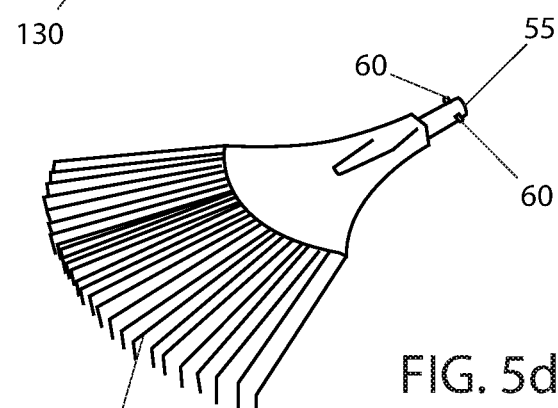
FIG. 5d perspective view of an optional tool head 15 that can be used with the adjustable length yard tool 10, according to a fourth alternate embodiment of the present invention.
Figure 5E:
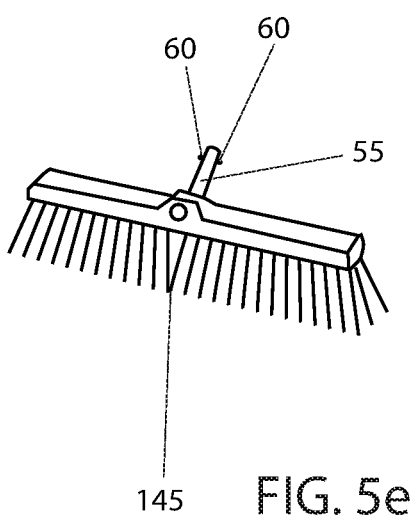
FIG. 5e perspective view of an optional tool head 15 that can be used with the adjustable length yard tool 10, according to a fifth alternate embodiment of the present invention; and, FIG. 5f perspective view of an optional tool head 15 that can be used with the adjustable length yard tool 10, according to a sixth alternate embodiment of the present invention.
Figure 5F:
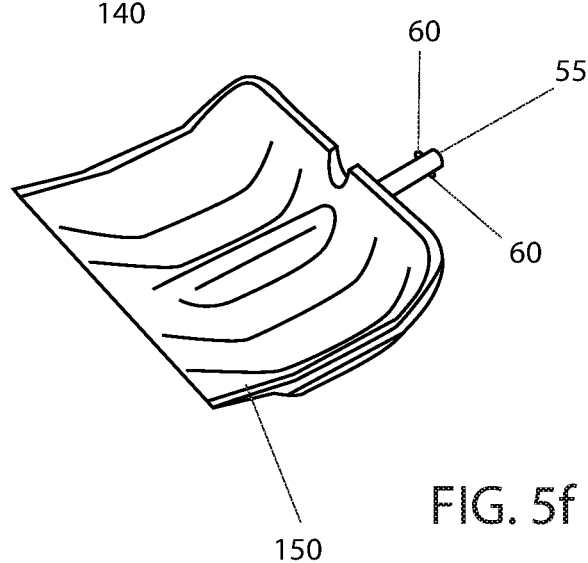

Referring next to FIG. 4, a sectional view of the tool 10, as seen along a line I-I, as shown in FIG. 1, according to the preferred embodiment of the present invention is disclosed. The disclosure in FIG. 4 provides additional learning on the overall length adjustment system utilized on the tool 10. The lower handle section 25 is positioned within the hollow space 90 of the upper handle section 35 in an axial manner. A loose coil spring 95 is positioned with one (1) end against the upper face 100 of the lower handle section 25 and a closed end 105 of the upper handle section 35. The loose coil spring 95 thus serves to aid in the automatic extension of the lower handle section 25 when the long handle configuration of the tool 10, as shown in FIG. 1 is desired. The user would then compress the loose coil spring 95, when the short-handled configuration of the tool 10, as shown in FIG. 2 is desired. The upper handle section 35 is secured to the lower handle section 25 at whatever length desired by the use of a slotted compression ring 110, as part of the rotating coupling system 40. A slotted compression ring 110 is permanently affixed to the distal end of the upper handle section 35 with a threaded collar 115 about its exterior. It is envisioned that the slotted compression ring 110 would be made of a durable material with a low coefficient of friction such as nylon. Thus, as the threaded collar 115 is moved along a second rotational travel path "R2" 120 it is compressed or relaxed against the lower handle section 25 where it allows for no movement or movement respectively. It is envisioned that the lower handle section 25 and upper handle section 35 would be made of durable, strong material that can withstand the stress of pressure and leverage applied along its length. Materials such as steel, aluminum, fiberglass, carbon fiber, or the like serve as possible candidates. However, the material of construction used with the lower handle section 25 and the upper handle section 35 are not intended to be limiting factors of the present invention.

Referring finally to FIGS. 5*a*-5*f*, various perspective views of optional tool head 15 that can be used with the tool 10, according to the preferred embodiment of the present invention is depicted. It should be noted that the tool head 15 as shown in FIGS. 5*a*-5*f* represent only a sampling of the possible tool head 15 used with the tool 10 and as such, are not intended to be all inclusive. A flat nosed (coal) shovel head 125 is provided for moving of loose material. A garden rake head 130 is provide for final grading of soil. A garden hoe head 135 is provided digging or loosening compacting soil. A leaf rake head 140 is provided for raking leaves. A push broom head 145 is provided for sweeping paved surfaces. A snow shovel head 150 is provided for removal of snow. It is also noted that each of the tool head 15 shown provides for a tool head shaft 55 and a pair of engagement pins 60 that allow for mating as shown in FIG. 3. It is also envisioned that a storage case 155 (not shown) could be provided for purposes of storage and ease of transport for any and all components as aforementioned described.

2. Operation of the Preferred Embodiment

The preferred embodiment of the present invention can be utilized by the common user in a simple and effortless manner with little or no training. It is envisioned that the tool 10 would be constructed in general accordance with FIG. 1 through FIG. 5*f*

The user would procure the tool 10 with specific regards and attention paid to the components needed. It is envisioned that a minimal amount of components would include the handle section consisting of the lower handle section 25, the upper handle section 35 and the "D"-ring handle 45 along with at least one (1) tool head 15 such as the spade-style shovel head 20, the flat nosed (coal) shovel head 125, the garden rake head 130, the garden hoe head 135, the leaf rake head 140, the push broom head 145, or the snow shovel head 150, with additional tool head 15 purchased on as-needed basis. An entire ensemble may also be purchased complete with a storage case 155.

After procurement and prior to utilization, the tool 10 would be prepared in the following manner: the rotating coupling system 40 on the upper handle section 35 would be loosened and the lower handle section 25 extended to the desired length if needed; the rotating coupling system 40 would then be secured using the threaded collar 115 against the slotted compression ring 110 on the lower handle section 25; the desired tool head 15 would be selected; the desired tool head 15 would be attached to the lower handle section 25 by positioning the engagement pins 60 within the first part of the pin slots 65; by holding the lower handle section 25 in one (1) hand, and while simultaneously squeezing the spring loaded levers 80 and turning the rotating collar 75 with the other, the engagement pins 60 would be driven into the final part of the pin slots 65; and then the spring loaded levers 80 would be released, securing the engagement pins 60 and thus the spade-style shovel head 20.

During utilization of the tool 10, the tool 10 would be utilized in the same manner as any conventional long-handled or short-handled counterpart. Should the change of a tool head 15 be needed, the above-mentioned procedure would be reversed to remove the existing tool head 15 and then repeated to attach the new desired tool head 15.

After use of the tool 10, the tool 10 would be cleaned of any dirt or debris, disassembled and then stored in tis storage case 155 until needed again in a repeating manner. It is noted that the tool 10 provides for reduced storage space, neater storage space, lower overall cost than multiple individual tools, and no requirement of tools for assemble or disassembly when compared to conventional tools. Such features allow all needed tool 10 to be brought to a work site, versus having to go back and get a forgotten tool 10. Such features are ideally suited for professional workers who must transport all needed tools in a truck where storage space is at a premium.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An adjustable length yard tool, comprising:
    a tool head attached to a lower handle section via a quick-release mechanism;
    an upper handle section positioned axially to said lower handle section joined together by a rotating coupling system, said upper handle section includes a hollow interior and accepts insertion of said lower handle section within said hollow interior;
    a D-ring handle provided on an upper most end of said upper handle section, said D-ring handle serves to provide control during usage of said adjustable length yard tool; and
    a tool head shaft provided on an end of said tool head, said tool head shaft is provided with a pair of engagement pins, said pair of engagement pins are arranged at diametrically opposing sides from each another along said tool head shaft, said pair of engagement pins engage a pair of generally L-shaped pin slots in said rotating coupling system, and said rotating coupling system rotates a first rotational travel path;
    wherein said upper handle section is secured to said lower handle section by a slotted compression ring.

2. The adjustable length yard tool, according to claim 1, wherein said lower handle section is positioned within said hollow space of said upper handle section in an axial manner.

3. The adjustable length yard tool, according to claim 2, further comprising a loose coil spring positioned with an end against said upper face of said lower handle section, said loose coil spring aids in automatic extension of said lower handle section.

4. The adjustable length yard tool, according to claim 1, wherein said lower handle section and said upper handle section are made of durable and strong material that withstands pressure and leverage applied along their lengths.

5. The adjustable length yard tool, according to claim 4, wherein said upper handle section is driven downward along a first travel path, whereupon said rotating coupling system secures said D-ring handle adjacent to said lower handle section.

6. The adjustable length yard tool, according to claim 4, wherein said durable and strong material is selected from the group consisting of steel, aluminum, fiberglass, or carbon fiber.

7. The adjustable length yard tool, according to claim 1, wherein said tool head is selected from the group consisting of a spade-style shovel head, a flat nosed shovel head, a garden rake head, a garden hoe head, a leaf rake head, a push broom head, and a snow shovel head.

8. The adjustable length yard tool, according to claim 1, wherein during initial engagement of said pair of engagement pins, a user would position said pair of engagement pins within said pair of pin slots by holding said lower handle section in a first user hand, and while simultaneously squeezing said pair of spring-loaded levers and turning said rotating collar with a second user hand.

9. The adjustable length yard tool, according to claim 8, wherein said pair of engagement pins are driven into said pair of pin slots.

10. The adjustable length yard tool, according to claim 8, wherein said adjustable length yard tool has a collapsed length of 4 feet and an extended length of 7 feet.

11. The adjustable length yard tool, according to claim 1, wherein said adjustable length yard tool has a length in the range of 4 to 7 ft.

12. The adjustable length yard tool, according to claim 1, wherein said adjustable length yard tool provides for reduced storage space and lower overall cost than a plurality of other conventional tools.

13. The adjustable length yard tool, according to claim 1, further comprising a storage case for storage and ease of transport of said adjustable length yard tool.

* * * * *